United States Patent
Shimada et al.

(10) Patent No.: US 7,137,128 B2
(45) Date of Patent: Nov. 14, 2006

(54) PORTABLE INFORMATION PROCESSING APPARATUS INCLUDING A DISK DRIVE DEVICE

(75) Inventors: Isao Shimada, Hyogo (JP); Seiji Yoshii, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 263 days.

(21) Appl. No.: 10/765,186

(22) Filed: Jan. 28, 2004

(65) Prior Publication Data

US 2004/0228264 A1 Nov. 18, 2004

(30) Foreign Application Priority Data

Apr. 25, 2003 (JP) ............................ 2003-121199

(51) Int. Cl.
*G11B 17/03* (2006.01)
(52) U.S. Cl. .................................... 720/601
(58) Field of Classification Search .................... None
See application file for complete search history.

(56) References Cited

U.S. PATENT DOCUMENTS

| | | | |
|---|---|---|---|
| 4,669,053 A * | 5/1987 | Krenz ........................ 361/680 |
| 5,021,922 A * | 6/1991 | Davis et al. ................. 361/681 |
| 5,347,630 A * | 9/1994 | Ishizawa et al. ............ 345/538 |
| 5,708,561 A * | 1/1998 | Huilgol et al. .............. 361/681 |
| 6,078,497 A * | 6/2000 | Derocher et al. ........... 361/683 |
| 6,169,847 B1 * | 1/2001 | Mizoguchi et al. ......... 386/111 |
| 6,275,376 B1 * | 8/2001 | Moon ......................... 361/683 |
| 6,297,947 B1 * | 10/2001 | Howell et al. .............. 361/683 |
| 6,374,040 B1 * | 4/2002 | Mizoguchi et al. ......... 386/125 |
| 6,697,495 B1 * | 2/2004 | Youn .......................... 381/333 |
| 6,785,128 B1 * | 8/2004 | Yun ............................ 361/683 |

FOREIGN PATENT DOCUMENTS

JP 5-346829 12/1993

* cited by examiner

*Primary Examiner*—David Davis
(74) *Attorney, Agent, or Firm*—Wenderoth, Lind & Ponack, L.L.P.

(57) ABSTRACT

A portable information processing apparatus having a disk drive device and being reduced in size and weight is presented. This portable information processing apparatus comprises a disk drive device, a disk cover, a keyboard, and a casing main body. The disk cover can be opened and closed from the casing, and the disk drive device allows part of the disk recording medium to advance beneath the keyboard when the disk recording medium is loaded into the disk drive device.

7 Claims, 6 Drawing Sheets

PORTABLE INFORMATION PROCESSING APPARATUS INCLUDING A DISK DRIVE DEVICE

FIELD OF THE INVENTION

The present invention relates to a portable information processing apparatus, and more particularly to one having a detachable disk recording medium.

BACKGROUND OF THE INVENTION

Recently, notebook-sized personal computers (hereinafter called notebooks) and other small and lightweight information processing apparatuses are rapidly spreading widely. Along with an increase in capacity of application software and data, a detachable recording medium must have a large capacity. For the purpose of enjoying the music or movie, the notebook incorporates a disk drive device capable of reproducing or writing an optical disk such as a CD-ROM or a DVD-ROM.

Referring to FIG. 5 and FIG. 6, a conventional notebook is explained. FIG. 5 is a perspective outline view of the use of a conventional notebook incorporating a disk drive device. FIG. 6 is a bottom view in which a back plate of the casing has been removed. In FIG. 5, a main body 101 comprises an upper case 101a and a lower case 101b. On the top of the upper case 101a, there is a keyboard 102 with an arrangement of a number of keys for the input of text, numerals and symbols and for giving various instructions to the notebook. At the front side of the top of the upper case 101a, there is a pointing device 103 such as keypad for position input on the screen. A display unit 105 is installed rotatably on an axis 104 parallel to the end behind the main body, and at the side facing the keyboard 102 when the display unit 105 is closed, a display device 106 such as liquid crystal display device is disposed.

When an eject button 110 as shown in the drawing is pushed, a disk drive device 109 is slid out as being driven by a motor from the left side of the main body. The disk drive device 109 accepts a disk 107 such as CD-ROM or DVD-ROM rotatably on a drive shaft 108, and can read from the disk 107 or write into the disk 107.

A conventional notebook with a disk drive device is disclosed, for example, in Japanese Laid-open Patent No. H5-346829.

In the conventional notebook, however, since the disk drive device is designed to slide out, a slide mechanism is needed, and the weight is increased due to the drive mechanism or motor. In addition, because of the sliding motion of the disk drive device and the disk, the disk drive device space and the disk moving space require free space so as not to contact other parts in the moving range of other constituent components. Therefore, the volume efficiency is poor.

Further, since the side of the casing is notched, the structural strength of the casing is lowered. As a countermeasure, the strength must be assured by increasing the wall thickness of the upper case and lower case, and both weight and volume are increased.

The notebook disclosed in Japanese Laid-open Patent No. H5-346829 is designed to open and close the entire keyboard unit. In such a system of opening and closing the entire keyboard unit, various limitations occur when composing the notebook, and there are problems in cooling. For example, since a keyboard is not fixed, the structure becomes weak or it becomes difficult to contact the keyboard unit bottom with an exothermic portion, and to make heat radiate.

SUMMARY OF THE INVENTION

In view of the above problems, a portable information processing apparatus comprises a disk drive device for receiving a detachable disk recording medium; a disk cover for covering the disk drive device; a keyboard for data input; and a casing main body. The disk cover can be opened and closed from the casing, and the disk drive device allows part of the disk recording medium to advance beneath the keyboard when the disk recording medium is loaded into the disk drive device.

DETAILED DESCRIPTION OF THE EXEMPLARY EMBODIMENTS

It is hence an object of the invention to present a portable information processing apparatus enhanced in strength in spite of a thick wall of a casing. In addition, the apparatus does not need parts moving space around a disk drive device, thereby the entire casing is thin and small in volume. As result, the size and weight of the apparatus can be reduced.

Figure 1:
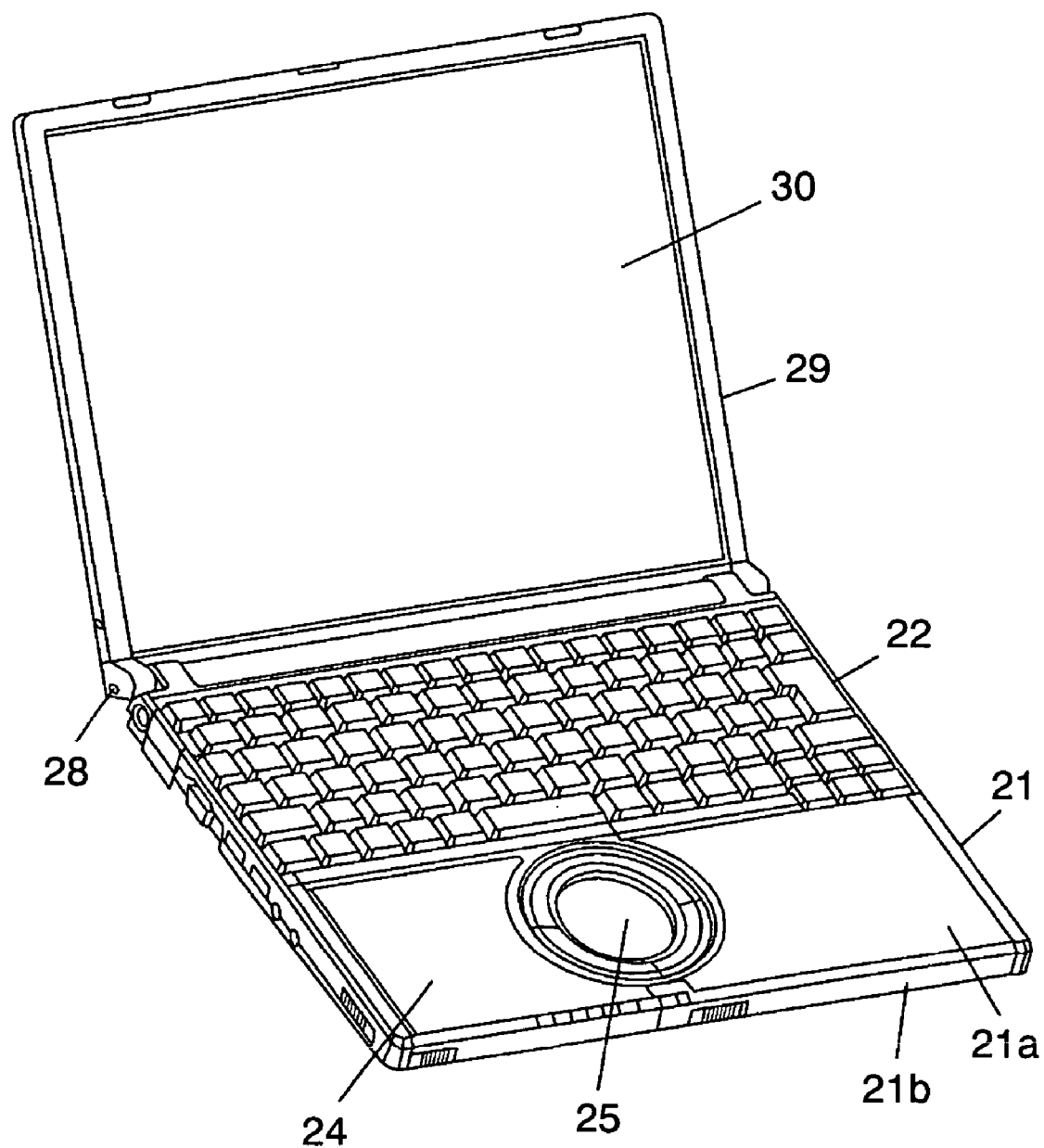
FIG. 1 is a perspective view showing a state of use of a portable information processing apparatus in an exemplary embodiment of the invention.
Figure 2:
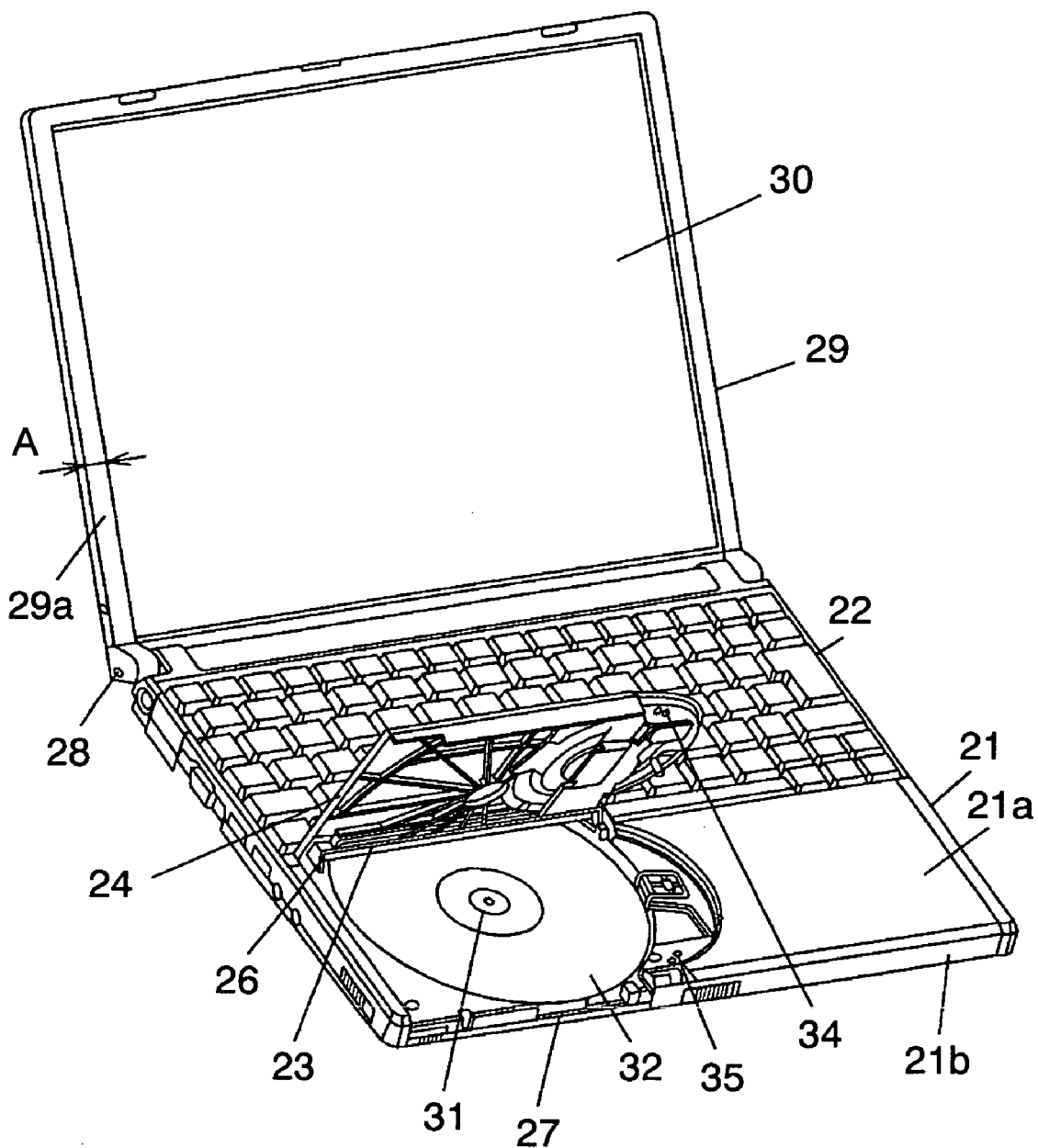
FIG. 2 is a perspective view showing a state of opening the disk cover of a portable information processing apparatus in an exemplary embodiment of the invention.
Figure 3:
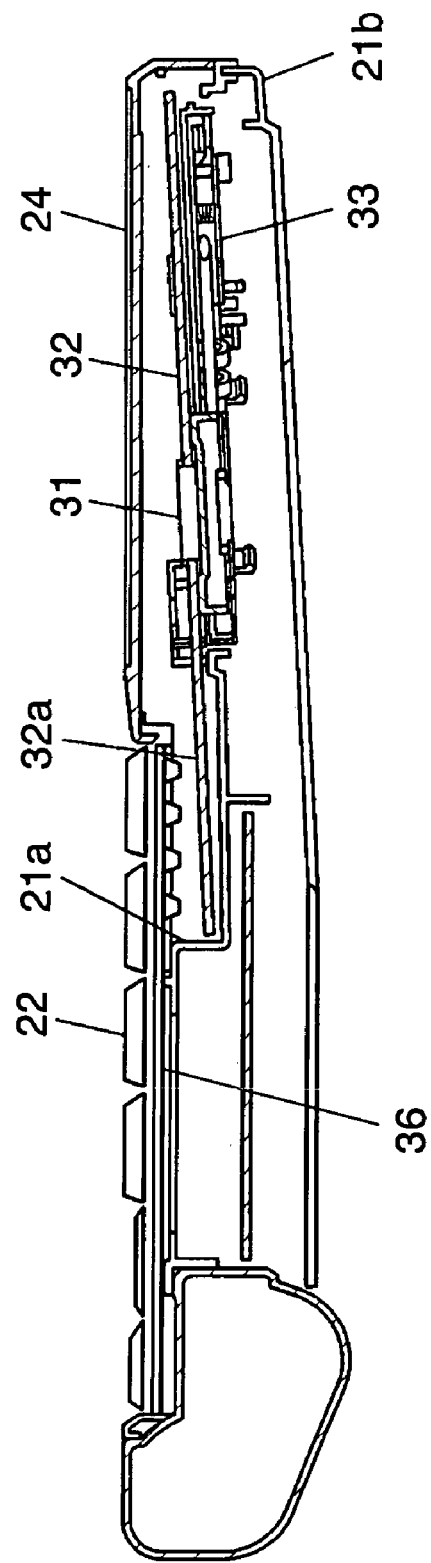
FIG. 3 is a sectional view showing the periphery of a disk drive device of a portable information processing apparatus in an exemplary embodiment of the invention.
Figure 4:
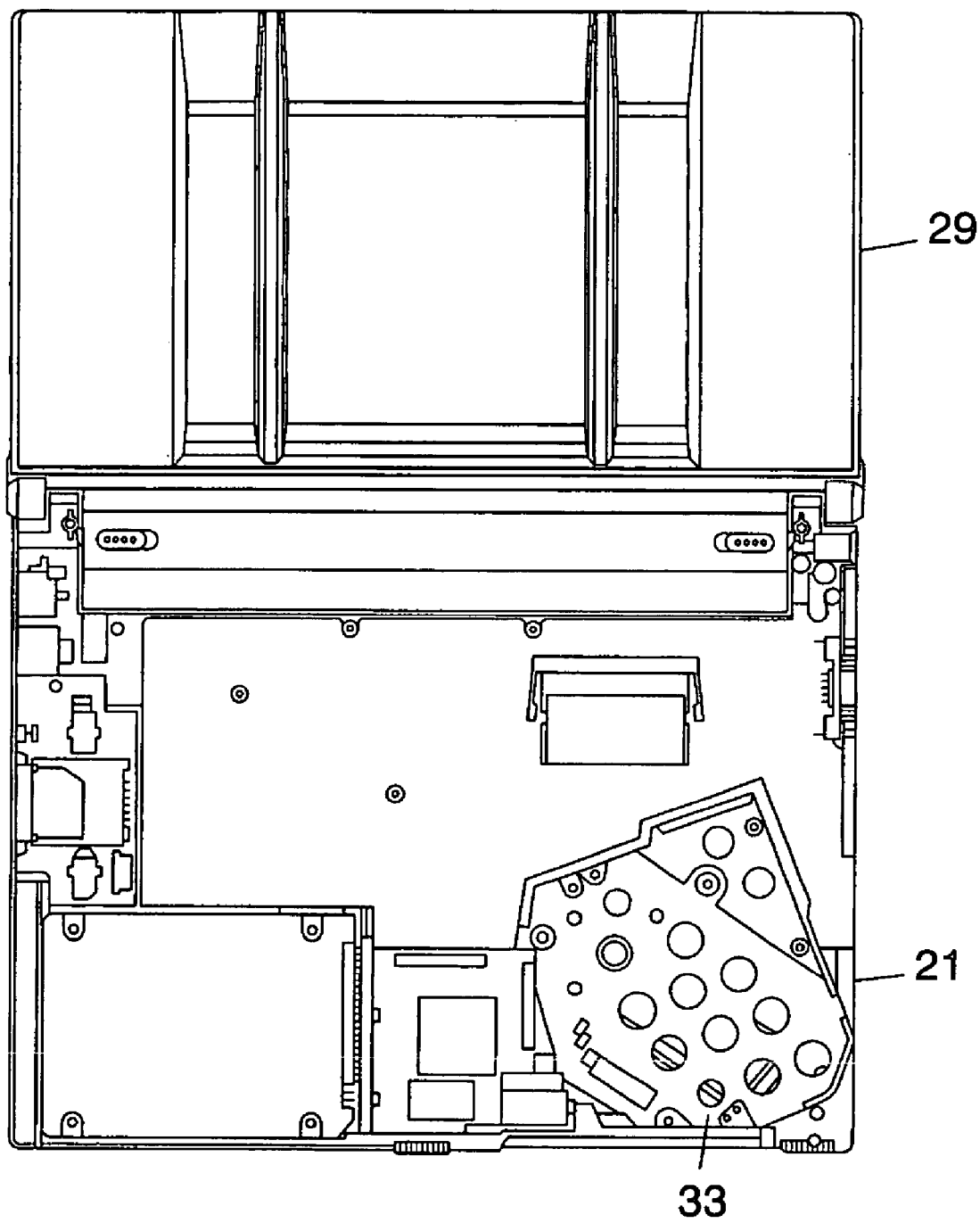
FIG. 4 is a bottom view showing a state of removing the lower case of a portable information processing apparatus in an exemplary embodiment of the invention.
Figure 5:
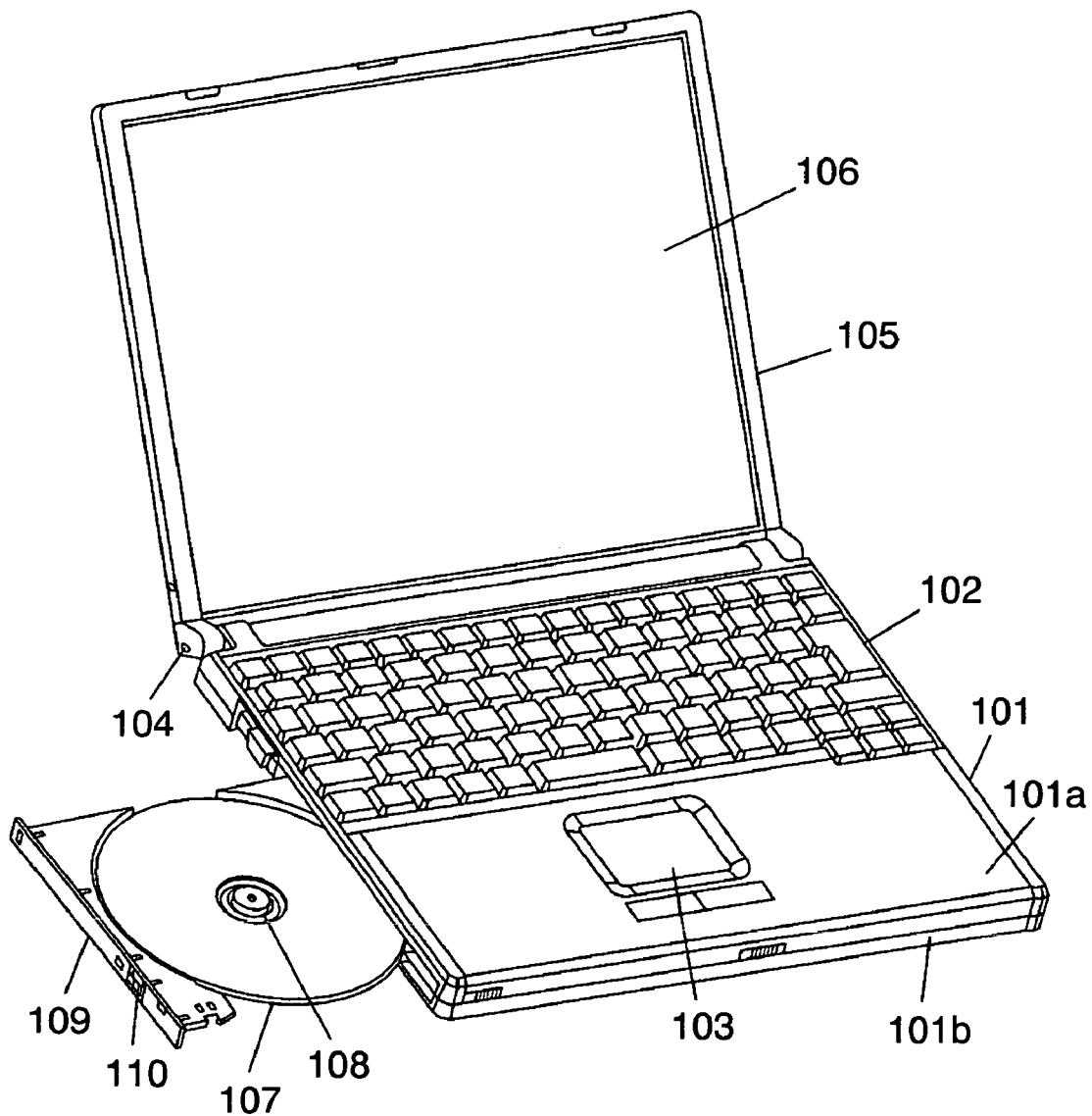
FIG. 5 is a perspective outline view of a state of using a conventional notebook.
Figure 6:
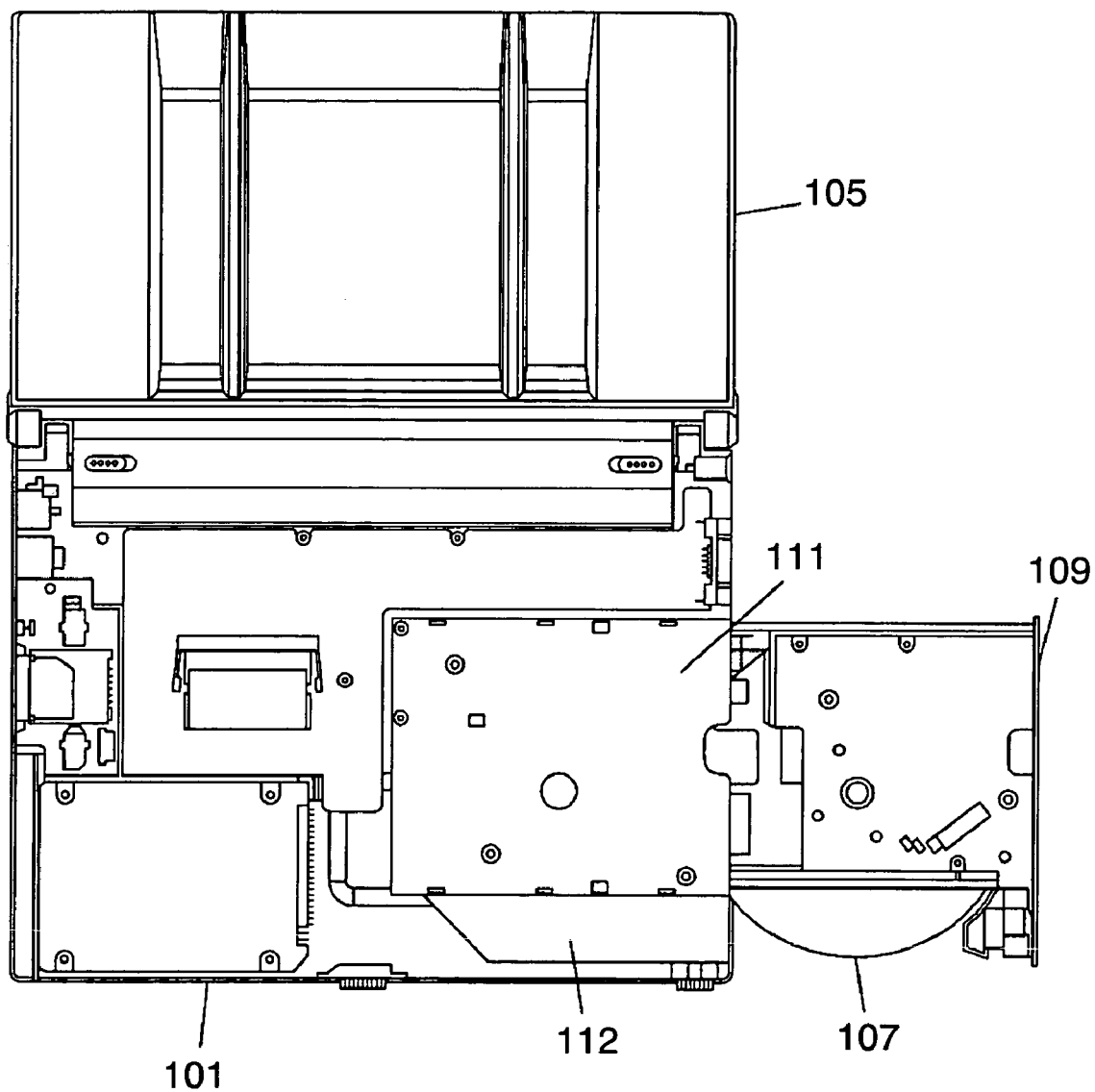
FIG. 6 is a bottom view in which the lower case of the casing of a conventional notebook is removed.

The portable information processing apparatus of the invention is explained specifically below by referring to an example of a notebook together with the accompanying drawings. FIG. 1 is a perspective view showing a state of use of a portable information processing apparatus in an exemplary embodiment of the invention. FIG. 2 is a perspective view showing a state of opening the disk cover of a portable information processing apparatus in an exemplary embodiment of the invention. FIG. 3 is a sectional view showing the periphery of a disk drive device of a portable information processing apparatus in an exemplary embodiment of the invention. FIG. 4 is a bottom view showing a state of removing the lower case of a portable information processing apparatus in an exemplary embodiment of the invention.

Exemplary Embodiment 1

In FIG. 1 and FIG. 2, a casing main body 21 which is a part of the casing is composed of an upper case 21a and a lower case 21b. The rear side top of the upper case 21a has a keyboard 2 in which a number of keys are arranged for the input of text, numerals and symbols and for giving various instructions to the notebook. The near side (closer side in FIG. 1 and FIG. 2) top of the upper case 21a has a disk cover 24. The disk cover 24 rotates (pivots) about a shaft 23. This shaft 23 is positioned near the closer side end edge (i.e., at the near-side edge) of the keyboard 22, and is disposed parallel to the near-side edge. In other words, as illustrated in FIGS. 1 and 2, the keyboard 22 is separate from the disk cover 24 so that the keyboard 22 is not located over the disk cover 24. The disk cover 24 usually closes the disk drive device in a hooking manner as described below. In part of the top of the disk cover 24, there is a pointing device 25 such as a keypad for the input of position or the like. The disk cover 24 is forced in the releasing (open) direction by a push-up spring 26 such as a helical spring as an urging member. The disk cover 24 is usually locked in a closed state by a lock mechanism 27. Although not shown in the drawing, it is preferred to have a stopper so that the disk cover 24 may not open more than a specified angle.

A display unit 29 which is part of the casing is provided rotatably (pivotably) about a shaft 28 parallel to the end behind the casing main body 21. The display unit 29 includes a display device 30 such as a liquid crystal display device disposed at the side facing the keyboard 22 when the display unit 29 is closed.

In FIG. 2, a disk 32 such as a CD-ROM or a DVD-ROM is detachably mounted on a drive shaft 31 of a drive motor (not shown in FIG. 2) of a disk drive device 33 (see FIG. 3 and FIG. 4). The disk drive device 33 (see FIG. 3 and FIG. 4) is fixed to the casing directly or by way of a buffer (not shown in FIG. 2). At this time, part of the disk 32 is located beneath the keyboard 22, and overlaps with the keyboard 22, and hence the depth of the main body 21 can be reduced. Two protrusions 34 are provided at the back face of the disk cover 24, and when the disk cover 24 is closed, a switch 35 provided in the main body 21 is pressed. By pressing the switch 35, the power source is turned on in the laser emission device of the disk drive device 33, and it is ready to drive. In this manner, when the disk cover 24 is opened, the power source of the laser emission device is not turned on for the sake of safety. In short, the switch 35 turns on or off the electric circuit by the protrusions 34 depending on whether the disk cover is opened or closed. By opening or closing the electric circuit, the disk drive device 33 is controlled.

The disk 32 such as a CD-ROM or a DVD-ROM is an example of a disk recording device. The disk 32 described in the present invention is not limited to a CD-ROM or a DVD-ROM, but can be realized by another disk recording medium.

The invention is further described below while referring to FIG. 3, which is a sectional view showing the periphery of disk drive device of a portable information processing apparatus in an exemplary embodiment of the invention. When the disk 32 is mounted on the drive shaft 31 of the disk drive device 33, the drive shaft 31 is inclined (i.e., the disk drive device 33 is inclined relative to the disk cover 24) so that the portion 32a of the disk 32 located beneath the keyboard 22 can be lower than other portions of the disk. Thus, the space can be used effectively.

FIG. 4 is a bottom view showing a state in which the lower case of a portable information processing apparatus in an exemplary embodiment of the invention is removed. Referring to FIG. 4, mounting of electric circuits such as heat generating parts are described below. In FIG. 4, the lower side 36 of the keyboard 22 (see FIG. 1 to FIG. 3) is made of a material of excellent heat conductivity. As the material, any metal small in specific gravity and high in heat conductivity is preferred. For example, aluminum or copper can be used. The portable information processing apparatus requires, for example, various electric circuits such as an information processor and an amplifier for video and audio output. These components include heat generating parts accompanied by generation of heat, and are often mounted in a small space. Therefore, heat dissipating measures of these components are important. These heat generating parts are fixed to the lower side 36 in an excellent heat conduction state with the lower side 36 of the keyboard 22. Thus, the heat generating parts are cooled effectively.

Thus, according to the exemplary embodiment, without lowering of the strength of the main body case due to notching of the side face of the main body case as in the prior art, it is not necessary to add thickness of the main body case to compensate for such lowering, and the inner space is not increased or the weight is not increased due to slide mechanism. Therefore, a portable information processing apparatus of small size and light weight can be realized.

Also in the exemplary embodiment, unlike Japanese Laid-open Patent No. H5-346829, the entire keyboard is not opened, and the keyboard is fixed in the casing and the structure is rigid. In addition, the keyboard unit bottom may be composed of material of high heat conductivity such as aluminum or copper, and heat can be dissipated by bringing the CPU or other heat generating parts in contact with this bottom.

Exemplary Embodiment 2

This exemplary embodiment is described by referring to the same drawings, FIG. 1 to FIG. 4, as used in the explanation of exemplary embodiment 1. In FIG. 2, when the disk cover 24 is open accidently when attempting to close the display unit 29 by turning in the direction of the main body 21, the display device 30 of the display unit 29 may hit against the disk cover 24 and may be broken. In this exemplary embodiment, the margin 29a of the display unit 29 projects from the display device 30. Further, the width A of the margin 29a is set to hit against the disk cover 24. In other words, the disk cover 24 is installed at a position to hit against (contact) the margin 29a.

To prevent breakage of the display device 30 more effectively in the event of collision of the display device 30 of the display unit 29 against the disk cover 24, a push-up spring 26 is disposed at the closer side to the margin 29a of the disk cover 24, that is, at the left side in FIG. 2. The reason is that if provided at the far side form the margin 29a, that is, at the right side in FIG. 2, a lifting force is applied at the right side, and the disk cover 24 is twisted. As a result, the right side may first hit against the side of the display device 30.

Thus, according to the exemplary embodiment, the margin of the display unit rotatable about the shaft of the main body projects from the display device, and is disposed at a position so as to hit against the disk cover, and the push-up spring of the disk cover is provided at a side closer to the margin of the display unit. Therefore, if attempting to close the display unit by mistake while the disk cover is open, damage to the display device can be prevented.

The configuration of constituent parts shown in the foregoing exemplary embodiments is a mere example, and can be freely changed or modified within the scope of the claims.

Herein, the reproduction-only disk is explained, but a recordable disk can also be used if the disk drive device is applicable.

According to the portable information processing apparatus of the invention as described herein, since the side of the casing is not notched, the strength is enhanced even if the casing is small in thickness. Without lowering of the strength of the main body case due to notching of the side face of the main body case, it is not necessary to add the thickness of the main body case to compensate for such lowering. Further, the inner space is not increased or the weight is not increased due to a slide mechanism of the disk drive device, thereby not requiring the space around the disk drive device or parts moving space. Therefore, the volume efficiency is high, the casing height is lowered, and the size and weight can be reduced. Thus, the invention realizes a small and lightweight portable information processing apparatus.

The invention also prevents damage due to accidental contact between the display device and the disk cover when attempting to close the display unit by mistake while the disk cover is open.

What is claimed is:

1. A portable information processing apparatus comprising:
   a casing main body;
   a keyboard for data input, said keyboard being fixed to said casing main body and having a near-side edge and a far-side edge;
   a disk drive device for receiving a detachable disk recording medium; and
   a disk cover for covering said disk drive device, said disk cover being arranged to pivot about a shaft at said near-side edge of said keyboard and oriented so as to be parallel to said near-side edge;
   wherein said disk drive device, said keyboard, and said disk cover are arranged so that only a part of the disk recording medium is located beneath said keyboard when the disk recording medium is received within said disk drive device.

2. The portable information processing apparatus of claim 1, wherein said disk cover comprises a pointing device for position input.

3. The portable information processing apparatus of claim 1,
   wherein said disk cover further comprises a protrusion;
   wherein said casing main body further comprises a switch;
   wherein said disk cover and said casing main body are arranged so that said switch opens or closes an electric circuit due to force from said protrusion depending on an opened or closed position of said disk cover; and
   wherein an operation of said disk drive device is controlled by the opening or the closing of said electric circuit.

4. The portable information processing apparatus of claim 1,
   wherein a lower side of said keyboard is made of a material having excellent heat conductivity characteristics, and said lower side is in contact with heat generating parts in said casing main body.

5. The portable information processing apparatus of claim 1, wherein said disk drive device is inclined relative to said disk cover so that the part of the loaded disk recording medium located beneath said keyboard is lower than other parts of the disk recording medium.

6. The portable information processing apparatus of claim 1, further comprising:
   a display unit pivotable with respect to said casing main body,
   wherein said display unit has a display device;
   wherein a margin of said display unit projects at a side of said display device; and
   wherein said margin and said disk cover are arranged so that said margin abuts against said disk cover when said display unit is closed while said disk cover is open.

7. The portable information processing apparatus of claim 6, further comprising:
   an urging member for forcing said disk cover in an open direction,
   wherein said urging member is provided at a side of said disk cover to abut against said margin.

* * * * *